(12) United States Patent
Rook et al.

(10) Patent No.: US 10,543,791 B2
(45) Date of Patent: Jan. 28, 2020

(54) DISPLAY SCREEN MOUNT (71) Applicant: Bentley Motors Limited, Cheshire (GB)

(72) Inventors: David Alan Rook, Cheshire (GB); Philip Wilson, Cheshire (GB)

(73) Assignee: Bentley Motors Limtied, Chesire (GB)

( * ) Notice: Subject to any disclaimer, the term of this patent is extended or adjusted under 35 U.S.C. 154(b) by 125 days.

(21) Appl. No.: 15/516,302

(22) PCT Filed: Oct. 12, 2015

(86) PCT No.: PCT/GB2015/052987
§ 371 (c)(1),
(2) Date: Mar. 31, 2017

(87) PCT Pub. No.: WO2016/059386
PCT Pub. Date: Apr. 21, 2016

(65) Prior Publication Data
US 2017/0305359 A1 Oct. 26, 2017

(30) Foreign Application Priority Data
Oct. 16, 2014 (GB) .................................. 1418364.4

(51) Int. Cl.
*B64D 11/00* (2006.01)
*B60R 11/02* (2006.01)
(Continued)

(52) U.S. Cl.
CPC .......... *B60R 11/0235* (2013.01); *B60R 11/02* (2013.01); *B64D 11/00151* (2014.12);
(Continued)

(58) Field of Classification Search
CPC ..... B60R 11/0235; B60R 11/02; B60R 11/00; B60R 2011/0092; B60R 2011/0082;
(Continued)

(56) References Cited

U.S. PATENT DOCUMENTS 5,362,144 A 11/1994 Shioya et al.
2005/0140191 A1 6/2005 Curran et al.
(Continued)

FOREIGN PATENT DOCUMENTS

CN 101374693 A 2/2009
CN 102869542 A 1/2013
(Continued)

OTHER PUBLICATIONS

International Search Report and Written opinion received in International Application No. PCT/GB2015/052987, dated Feb. 10, 2016, 11 pages.
(Continued)

*Primary Examiner* — Joseph W Becker
(74) *Attorney, Agent, or Firm* — Adler Pollock & Sheehan P.C.

(57) ABSTRACT

A display screen mount mounts a display screen (6) to the rear of a seat (1). The mount includes a guide which defines a guide path to guide the display screen support (7) from a stowed position to a deployed position. The guide path also allows for adjustment of the viewing angle in the deployed position. The guide path has a linear portion (105) along which the display screen support (7) is guided into a deployed position in which the screen is visible to the user and a non-linear portion (106) which allows different viewing angles of the display screen (6) to be adopted in the deployed position.

17 Claims, 7 Drawing Sheets

(51) Int. Cl.
  *F16M 13/02* (2006.01)
  *B60R 11/00* (2006.01)
(52) U.S. Cl.
  CPC ............ *F16M 13/022* (2013.01); *B60R 11/00* (2013.01); *B60R 2011/0015* (2013.01); *B60R 2011/0082* (2013.01); *B60R 2011/0092* (2013.01); *B64D 11/00* (2013.01)
(58) Field of Classification Search
  CPC .......... B60R 2011/0015; F16M 13/022; B64D 11/00151; B64D 11/00
  See application file for complete search history.

(56) References Cited

U.S. PATENT DOCUMENTS

| | | | |
|---|---|---|---|
| 2008/0121762 A1 | 5/2008 | Slatosch et al. | |
| 2008/0196201 A1 | 8/2008 | Anderson | |
| 2009/0008974 A1 | 1/2009 | Hattori et al. | |
| 2009/0013357 A1* | 1/2009 | Cassellia | B60K 35/00 725/75 |
| 2009/0038422 A1* | 2/2009 | Choi | B60R 11/0235 74/89.17 |
| 2009/0085383 A1* | 4/2009 | Hicks | B60K 35/00 297/217.3 |
| 2010/0259078 A1 | 10/2010 | Saito et al. | |
| 2011/0063530 A1 | 3/2011 | Karsch et al. | |
| 2012/0050626 A1 | 3/2012 | Tsuzuki et al. | |
| 2014/0077576 A1 | 3/2014 | Brawner | |

FOREIGN PATENT DOCUMENTS

| | | |
|---|---|---|
| DE | 3223528 A1 | 2/1983 |
| DE | 3723027 C1 | 9/1988 |
| DE | 102009007991 A2 | 8/2010 |
| EP | 0551078 A1 | 7/1993 |
| EP | 1498316 A1 | 1/2005 |
| FR | 2948082 A1 | 1/2011 |
| JP | 2006282100 A | 10/2006 |
| JP | 2009018760 A | 1/2009 |
| JP | 4227173 B2 | 2/2009 |
| JP | 2009137400 A | 6/2009 |
| JP | 2014142468 A | 8/2014 |
| WO | WO-2005096710 A2 | 10/2005 |

OTHER PUBLICATIONS

International Search Report and Written Opinion received in International Application No. PCT/GB2015/052991, dated Feb. 10, 2016, 10 pages.

* cited by examiner

DISPLAY SCREEN MOUNT

CROSS REFERENCE TO RELATED APPLICATIONS

This application is a national phase filing under 35 U.S.C. § 371 of International Application No. PCT/GB2015/052987 filed Oct. 12, 2015, which claims priority from Great Britain application number 1418364.4, filed Oct. 16, 2014, the entire contents of each are hereby incorporated by reference herein.

TECHNICAL FIELD OF THE INVENTION

The present invention relates to a mount for a display screen. In particular the invention relates to a display screen mount for use in seat backs and especially for use in automobile seat backs.

BACKGROUND TO THE INVENTION

It is known to mount display screens, such as audio visual display screens and touch screen displays to the rear of vehicle seats. These display screens can be mounted directly to the backrest, or headrest, of a vehicle seat, in a fixed fashion or in which a user (viewer) may adjust the viewing angle of the display by pushing or pulling the display screen about a rotational axis. In some vehicles, such as aircraft and other passenger carrying vehicles, it is known to mount a display screen to an interior surface of the vehicle such as the interior roof surface, and the display screen may be in a fixed position, or mounted such that it may be electrically stowed and rotated from the stowed position into a viewable position as and when required.

In certain vehicles, such as automobiles, it is preferred to mount the screen in a housing in the back of the seat, such that it is out of sight and protected by the housing. A particularly advantageous arrangement has the screen housed flat against the back of the seat, in a housing, from which it extends axially (upwards) out of the housing, into a viewing position. Especially, but not exclusively, in automobiles, where the position and orientation of the seat in which the screen is displayed is adjustable, it is useful to be able to adjust the viewing angle of the screen. US2009/0085383 discloses an example of such a mount, in which the display extends axially from a mount to a deployed position and is pivotally mounted from its top to the top of the support, so that the plane of the display is movable relative to the plane of the display support.

However, this example, whilst effective, suffers certain drawbacks, in particular the size and complexity of the additional pivoting structure; the necessity to push the display screen back into position flush with the support before retracting it; and the potential for the display screen to change its position in relation to the pivot and to shake or rattle.

Embodiments of the present invention have been made in consideration of these problems, with a view to mitigating or alleviating them.

SUMMARY OF THE INVENTION

According to a first aspect of the invention, there is provided a display screen mount comprising a display screen support operably connected to at least one guide; the guide defining a guide path for guiding the display screen support from a stowed position to a deployed position and allowing adjustment of the viewing angle in the deployed position; wherein: the guide path has a first substantially linear portion such that the display screen support is guided along a first substantially linear path, into a deployed position in which the screen is visible to the user; and the guide path has a second non-linear portion which allows different viewing angles of the display screen to be adopted in the deployed position.

Such an arrangement, in which the guide path itself, rather than a separate pivot, affords the possibility of tilting the screen to adjust the viewing angle has several advantages. For example, it is less bulky, and requires fewer additional components than a separate pivot, can guide the display back into the stowed position without additional manual/electric tilting operations and is less likely to shake, rattle, or move out of position.

The at least one guide may comprise at least one track along which a slide slides. A track, such as a rail, along which a slide is slidably guided provides a convenient guide.

The at least one guide may further comprise a second track along which a second slide slides. The provision of a plurality of tracks allow a greater level of adjustability.

The tracks along which the slides are driven may define different paths. With two tracks defining different paths, and slides attached to the display screen support travelling along the two different paths, a complex guide path can be obtained from relatively simple slide-paths.

The first track may define a substantially linear path and the second track may define an at least partially non-linear path. This allows a complex guide path to be obtained whilst one of the slide-paths remains very simple, being substantially linear.

The first slide may be driven by a linear drive and the second slide may be non-driven. In this instance, a fairly simple drive mechanism, such as a spindle drive, or a rack and pinion, can be used to follow the simple linear path, whilst the more complicated non-linear path in which the support is guided is defined by the path followed by the non-driven slide.

The display screen support may be pivotally mounted to the first slide. This allows a simple mechanism for the angle of the display screen to be adjusted relative to the first track and slide.

The display screen support may be fixedly mounted to the second slide. A fixed attachment to the second slide, which defines the guide path and hence sets the angle of the display is less likely to cause rattle and more likely to remain in position.

Viewing angles in the deployed position may be adjusted manually. Manual adjustment of the viewing angle can allow for a simpler and more accurate positioning than electrical adjustment.

The second non-linear portion of the guide path may comprise an outwardly opening portion in which variation of the angle of the display screen support is less restricted. This outwardly opening portion can allow for the slide to move around within the track that restrains its movement, thereby allowing simple manual adjustment.

The second non-linear portion of the guide path may be defined by the second at least partially non-linear path mentioned above.

The second track may comprise a first linear portion, in which longitudinal movement of the slide is restricted (such that the angle of the screen is fixed during initial deployment) and a second non-linear, open portion, in which longitudinal motion of the slide is less restricted, such that in the deployed position, the viewing angle may be adjusted by manual longitudinal movement of the screen support.

The outwardly opening portion of the guide path, defined by the second at least partially non-linear path of the second track may be generally triangular, such that retraction to the stowed position causes the second slide to be guided into the linear portion of the second track.

The outwardly opening portion of the second non-linear portion of the guide path may comprise a concave portion arranged to restrict axial motion of the display screen beyond the deployed position. This prevention of continued axial motion in the deployment direction by a concave portion, provides a guiding region along which the slide can travel to adjust the amount of tilt.

The concave portion of the second non-linear portion of the guide path may be defined by a concave portion in the open portion of the second track.

The second track may comprise a third non-linear portion, prior to the second non-linear, open portion, in which movement of the first slide along the first substantially linear path results in longitudinal motion of the second slide along the third non-linear portion, so as to change the angle of the screen. This serves to define a default position of the screen at an angle other than that which it would normally remain, if it followed only the linear path of the first track. Accordingly the screen can be deployed to the most typical viewing angle and tilted backward or forward from that initial default position.

Regardless of the viewing angle of the screen in the deployed position, in stowing, the guide may cause the display screen to be stowed without any prior adjustment of the angle by a user.

As an alternative to manual adjustment, the viewing angle in the deployed position may be adjusted electrically. Electrical adjustment, if sufficiently well engineered can allow for very fine adjustment and additional benefits such as adjustment of screens that are out of reach, and the use of memory positions can be attained.

The second non-linear portion of the guide path may be defined by the second at least partially non-linear path mentioned above.

The second track may comprise a first linear portion, in which longitudinal movement of the slide is restricted (such that the angle of the screen is fixed during initial deployment) and a second non-linear portion, whereby movement of the first slide along the first substantially linear path results in longitudinal motion of the second slide along the second non-linear portion, so as to change the angle of the screen.

The electrically adjustable display screen mount may be mounted in a seat back, wherein the first linear path and the linear portion of the second non-linear path are substantially parallel to the seat back, whereby movement along the linear path brings the screen into a deployed position and movement along the non-linear portion of the guide path changes the viewing angle of the screen.

According to a second aspect of the invention, there is provided an electrically adjustable display screen mount comprising a switch mechanism operable by a user to select between a first automatic operation for stowing and deployment of the display screen, and a second, user adjustable operation for user adjustment of the deployed position of the display screen.

This can allow the initial deployment to be carried out at the press of a button, without holding on, whilst the fine adjustment of the angle can be carried out separately.

Preferably the electrically adjustable display screen mount is of the type set out above.

The switch may have a deployment memory position in which activation of the switch activates the first automatic operation to effect movement between the stowed position and a last used deployment position, and an adjustment mode position which activates the second user adjustable operation so that a user may adjust the deployment position of the display screen.

The adjustment mode position may include two separate functions, one which enables a user to adjust the deployment position of the screen in one direction and another in the opposite direction.

The deployment memory position may include two functions, one which is activated to deploy the display screen in a last used deployment position and the other which is activated to move the display screen to the stowed position.

The switch may comprise a stowing position, a detent corresponding to the adjustment mode position, and a deployment memory position.

The switch may be moved through the detent position into to the deployment memory position in order to deploy the display screen.

The switch may be moved to the detent position in order for a user to adjust the required deployment position of the display screen by way of the second user adjustable operation.

The detent may have two functions, a first function in which the detent position effects movement towards the display screen stowing position, and a second function in which the detent effects movement towards the deployment memory position.

The switch may be moveable in at least two directions, and the stowing position and deployment memory position of the switch may be effected by opposite movement of the switch.

The, user adjustable operation may enable rotation of the display screen up to 15°.

The switch may further comprise a neutral position, to which the switch is urged in absence of any user input.

The first automatic operation may cause the screen to move faster than the second user adjustable operation.

In a seat comprising an electrically adjustable display screen mount as set out above, movement in the deployment direction along the non-linear portion of the guide path may tilt the display screen support, so as to change the viewing angle such that the base of a display screen mounted on the display screen support moves longitudinally away from the back of the seat and/or the top of a display screen mounted on the display screen support moves longitudinally towards a headrest.

Movement of the base longitudinally away from the back of the seat, and/or movement of the top longitudinally towards a headrest may occur simultaneously with axial movement in the deployment direction. This means that in adjusting the angle, upward movement of the screen is accompanied by tilting of the screen such that the base moves towards the user and/or the top moves away from the user—this is particularly useful because when a seat is tilted backwards, its top will be lower and its angle will be towards the user of the screen. Accordingly, extension of the display screen mount results in angling the screen away from the user and lifting it higher, thereby compensating both for the angle and the height of the screen.

Movement of the adjustable display screen mount in the retraction direction may be associated with a corresponding movement of the base of the screen towards the back of the seat, and/or movement of the top of the screen away from the headrest.

The present invention also provides a seat comprising a display screen mount as set out above, mounted in the seat back, for viewing by a passenger in the seat behind. A vehicle comprising such a seat is also provided. The vehicle may be an automobile.

DETAILED DESCRIPTION OF THE INVENTION

In order that the invention may be more clearly understood, embodiments thereof will now be described, by way of example only, with reference to the accompanying drawings, of which.

The present invention relates to a display screen mount for mounting display screens 6 in vehicles, in particular in housings 4 in the back of seats 1 and especially in the seat backs of automobiles. The display mount is operable to move from a stowed position in a housing 4 in the seat 1, parallel to the axis of the body 2 of the seat 1 to a deployed position extending axially from the housing 4. The display mount includes a guide path which allows for different angles of the display screen 6 to be adopted.

With reference to FIGS. 1 to 5, a seat 1 of an automobile (not shown) has a main body portion 2, a headrest 3 and a housing 4 at the rear. The housing 4 has a slot 5 in its upper surface, through which a display screen 6 can move between a stowed position (shown in FIG. 1), within the housing 4, to a deployed position outside the housing 4 (shown in FIGS. 2-5).

Figure 6:
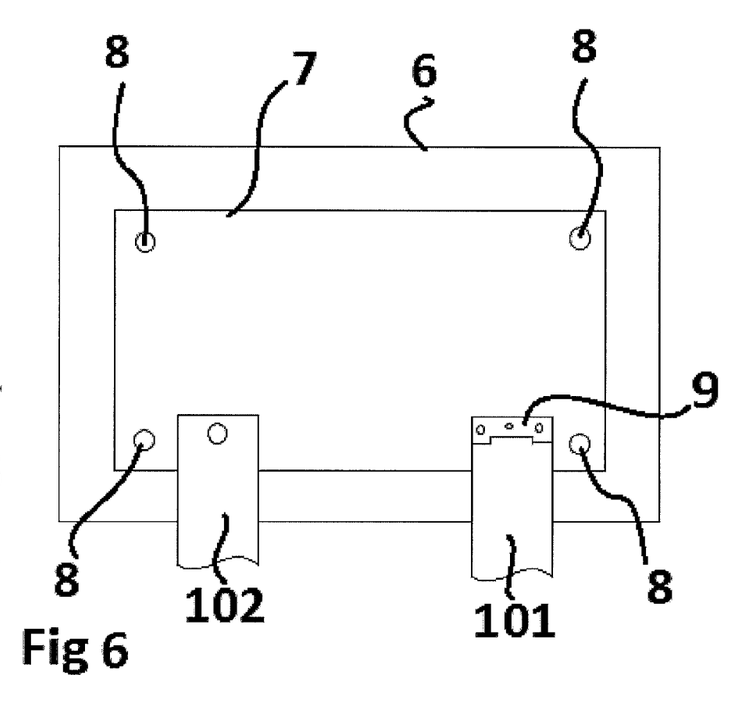
FIG. 6 shows a rear view of a display screen attached to a display screen support.

As shown in FIG. 6, the display screen 6 is attached to a display screen support 7 e.g. by fastenings 8, e.g. nuts/bolts. The display screen support 7 is pivotally mounted to a first slide 101, via a friction hinge 9 and fixedly attached to a second slide 102.

Referring once again to FIGS. 1-5, the first slide 101 is slidably mounted at its lower end to a first track 103 the track 103 may be a rail on which the slide 101 is mounted, e.g by wheels, although with suitable materials/lubrication wheels may not be necessary, or the track 103 may define a channel, in which the slide 102 slides, in this embodiment, the track is a pair of parallel rails between which the slide 101 is held. The first track 103 is linear and extends generally along the axis of the body of the seat 1, parallel to the main plane of the housing 4 which defines the seat back.

The first slide 101 is drivably mounted, for example by a rack and pinion mechanism, or a spindle drive. Indeed, in an alternative embodiment, the first slide 101 could include a rack mechanism, or the spindle and the separate track 103 could be eliminated. Accordingly, when the first slide 101 is driven, it follows the linear path defined by the first track 103. The first slide 101 could even, for example, be the rod of an (e.g. hydraulic) actuator (such as a ram), with the cylinder defining the first track 103.

The second slide 102 is also slidably mounted at its lower end, this time to a second track 104. The second track 104 is again a pair of rails, between which slide is held. The second track 102 though is non-linear and is shaped to guide the display screen support 7 as it moves between the deployed and stowed positions. In its lower region, the non-linear second track 104 has a linear portion 105. The linear portion 105 runs parallel to the linear path defined by the first track 103.

In an upper region, the second track 104 has a non-linear portion 106, which deviates from the linear path defined by the linear portion 105 in the lower region; the non-linear portion 106 curves away from axis of the linear path, longitudinally, towards the housing 4 and away from the axis of the body 2 of the seat 1. The non-linear portion 106 then straightens up to continue to define a path, which will be followed by the slide 102, upwards and away from the body 2 of the seat 1.

Then, at the top of the upper region, the pair of rails diverge and the path defined by the second track 104 opens out in a triangular shape. Thus, the movement of the second slide 102 in the track 104 becomes unrestricted backwards and forwards within the triangular portion 107.

The triangular portion 107 of the second track 104 has a corner at the bottom, where it meets the straight part of the non-linear portion 106, and extends upwards such that the other two corners are higher. The top side 108 of the triangular portion 107 is curved into a concave portion extending longitudinally, such that the second slide 102 can move backwards and forwards in the triangular portion 107 of the second track 104.

Figure 1:
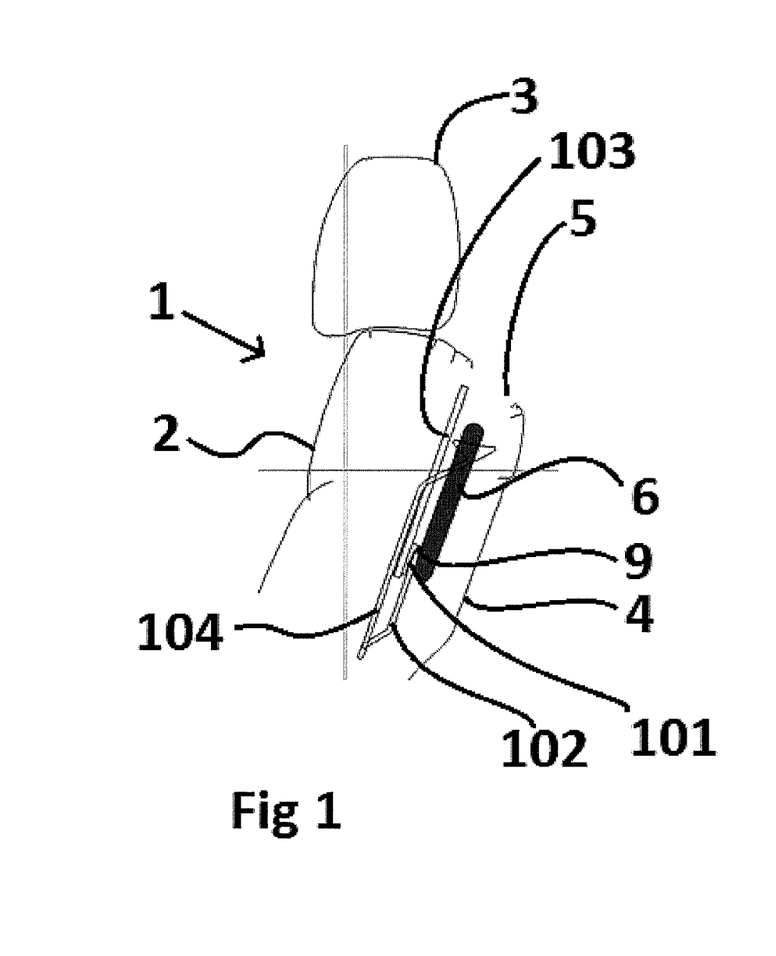
FIG. 1 shows a cross sectional view of a seat including a display screen mounted on a display screen mount according to a first embodiment of the invention, in a stowed position.

In use, to deploy the display screen 6 from the stowed position shown in FIG. 1, an electronic remote control is actuated. This drives the first slide 101 along the linear path defined by the first track 103. The non-driven second slide 102 is thus caused to follow a linear path along the linear portion 105 of the non-linear second track 104. This linear path is followed as the display screen 6 emerges from the slot 5 in the housing 4.

Then, the lower end of the second slide 102, which is slidably connected to the second track 104 reaches the non-linear portion 106. The first slide 101 continues to follow a linear motion, driving the display 6 upwards. However, the lower end of the second slide 102 follows a non-linear path, curving away from the axis of the body 2 of the seat 1. Because the display support 7 is pivotally mounted to the first slide 101 and fixedly mounted to the second slide 102, this movement causes the support 7 to it pivots about the hinge 9, with the result that the base of the display support 7 (and the display 6) moves longitudinally away from the axis of the body 2 of the seat 1. Correspondingly, the top of the display tilts towards the axis of the body 2, and towards the headrest.

When the lower end of the second slide 102 reaches the triangular portion 107 of the second track it simply follows the path defined by the linear slide 101 and linear track 103.

Figure 2:
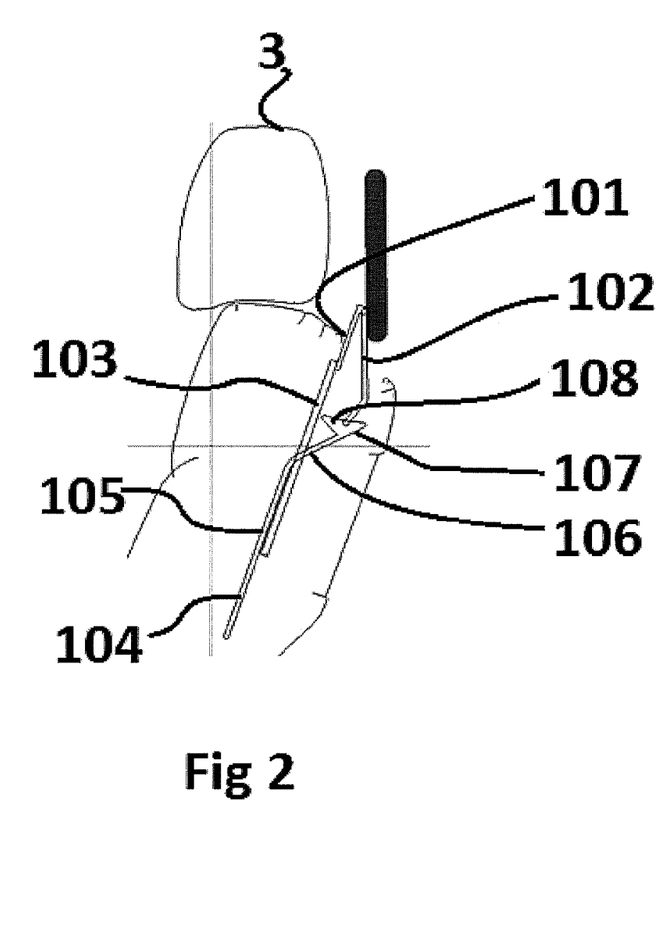
FIG. 2 shows a cross sectional view of the seat of FIG. 1 with the display screen mount in a deployed position set at a neutral tilt.

Accordingly, it reaches the neutral position shown in FIG. 2, with the slidably connected lower end of the second slide 102 in contact with the concave top side 108 of the triangular portion 107.

The slidably connected lower end of the second slide 102 may then be moved back and forth longitudinally along the concave top side 108 of the triangular portion 107, in response to manual tilting back and forth of the display screen 106. The friction hinge 9 connecting the display support 7 to the first slide 101 damps the tilting movement and prevents the slidably connected lower end of the second slide from wobbling within the triangular portion 107.

Figure 3:
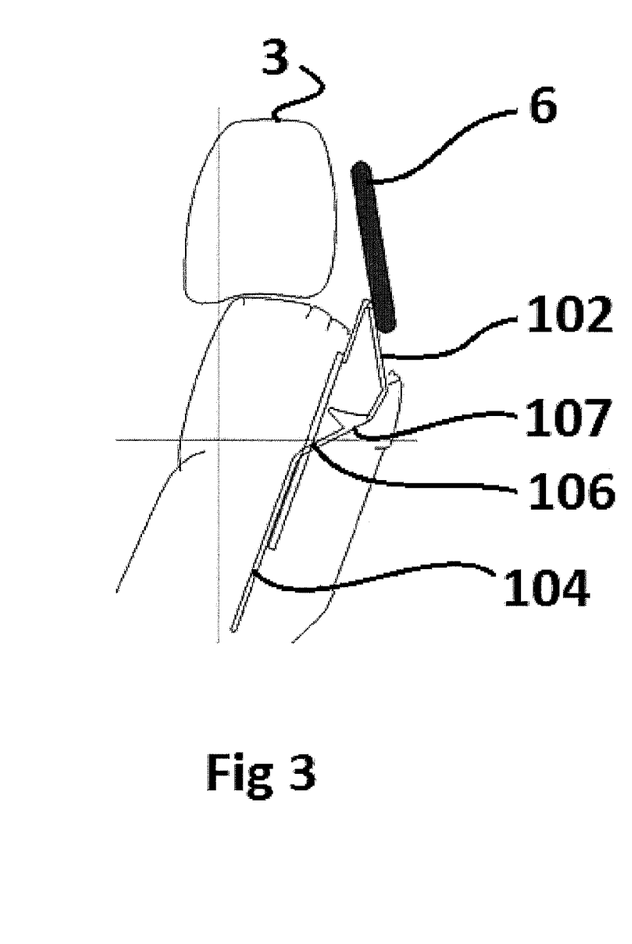
FIG. 3 shows a cross sectional view of the seat of FIGS. 1 and 2 with the screen mount in a deployed position set at a backward tilt.

FIG. 3 shows the display screen 6 tilted right backward (away from a user), with its top end close to the headrest 3 and its base close to the user. In this configuration, the lower end of the second slide 102, which is slidably connected to the second track 104 is at the rearmost corner of the triangular portion 107 of the non-linear portion 106 of the second track 104, closest to the user (not shown).

Figure 4:
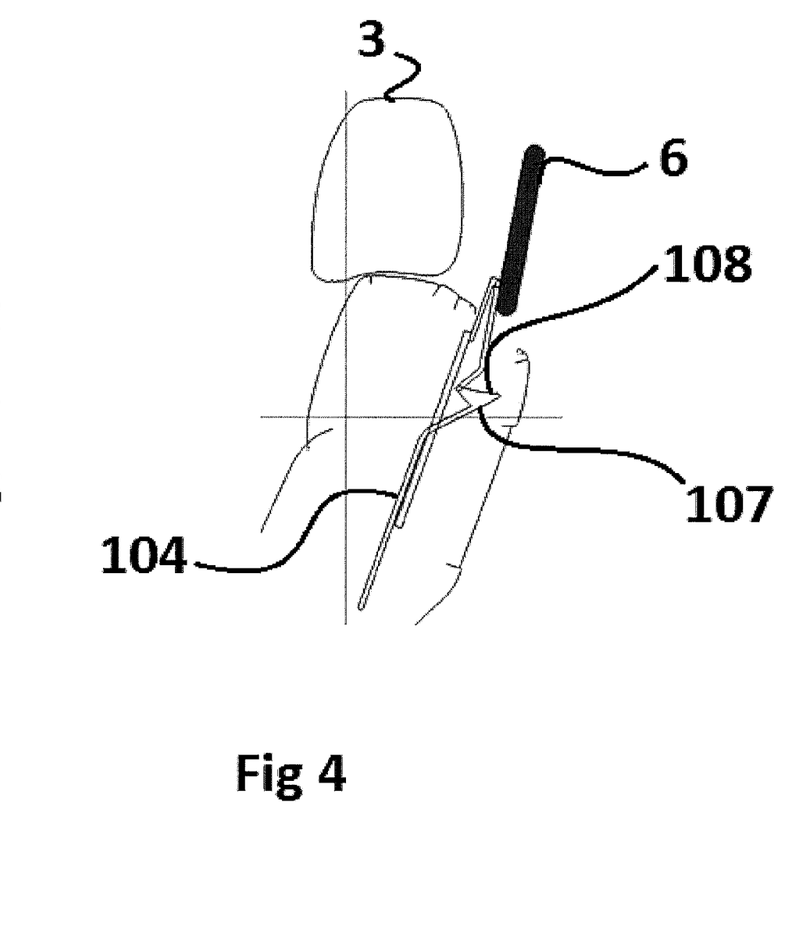
FIG. 4 shows a cross sectional view of the seat of FIGS. 1 to 3 with the screen mount in a deployed position set at a forward tilt.

FIG. 4, on the other hand, shows a position when the display screen has been tilted right forward, with its top end closer to the user, and the base closer to the headrest 3. In this configuration, in which the lower end has been slid longitudinally away from the user, along the bottom of the concave top side 108 of the triangular portion 107 of the second track 104, the lower end is in the foremost corner of the triangular portion 107, furthest from the user.

Figure 5:
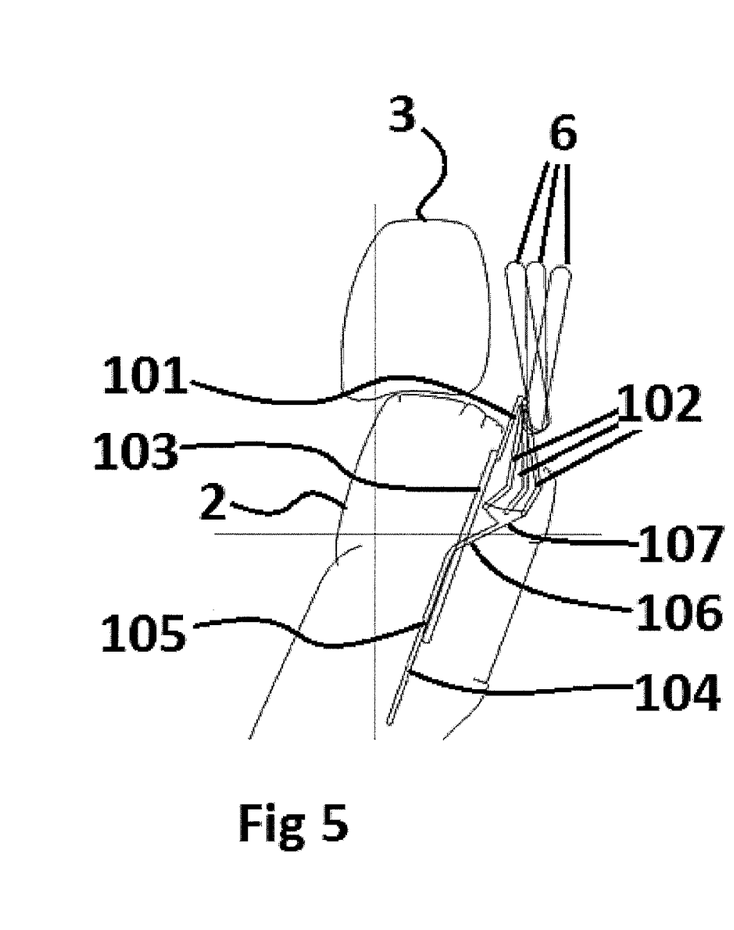
FIG. 5 shows a cross sectional view of the seat of FIGS. 1 to 4 in the deployed position showing backward, forward and neutral tilts.

Of course, numerous positions can be taken up, in between the rearmost, foremost and neutral positions, all of which are shown overlapping in FIG. 5.

Referring now to FIGS. 7-11, a second embodiment of the invention is shown. In the description of the second invention, certain features common to both embodiments are given the same reference numerals.

With reference to FIGS. 7 to 11, a seat 1 of an automobile (not shown) has a main body portion 2, a headrest 3 and a housing 4 at the rear. The housing 4 has a slot 5 in its upper surface, through which a display screen 6 can move between a stowed position (shown in FIG. 7), within the housing 4, to a deployed position outside the housing 4 (shown in FIGS. 8-11).

Figure 12:
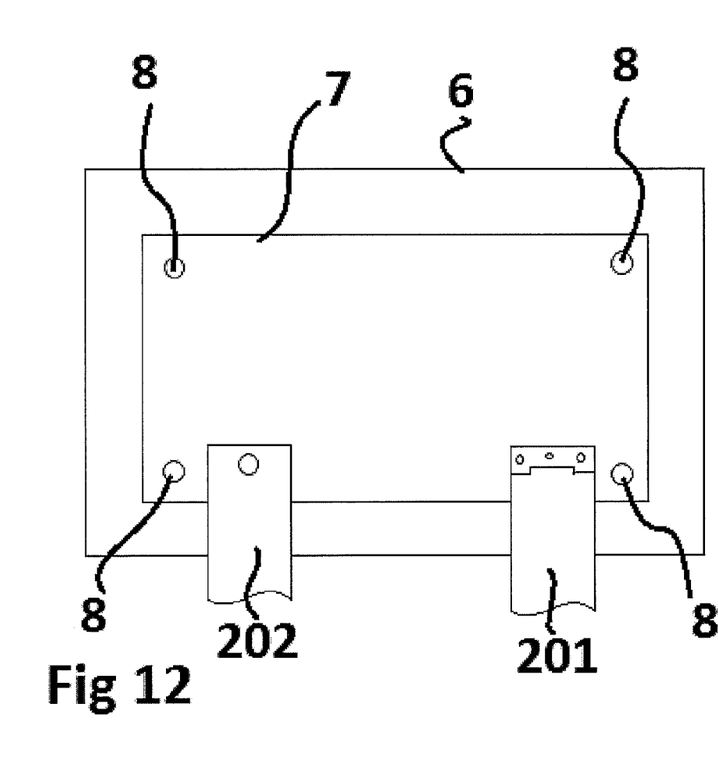
FIG. 12 shows a rear view of the display screen of attached to the screen mount of FIGS. 7-11.

Once again, and as shown in FIG. 12, the display screen 6 is attached to a display screen support 7 e.g. by fastenings 8, e.g. nuts/bolts. The display screen support 7 is pivotally mounted to a first slide 201, via a friction hinge 9 and fixedly attached to a second slide 202.

Referring once again to FIGS. 7-11, the first slide 201 is slidably mounted at its lower end to a first track 203 e.g. by wheels (not shown), although with suitable materials/lubrication wheels may not be necessary. The first track 203 is linear and extends generally along the axis of the body of the seat 1, parallel to the main plane of the housing 4 which defines the seat back.

The first slide 201 is drivably mounted, for example by a rack and pinion mechanism, or a spindle drive. Indeed, in an alternative embodiment, the first slide 201 could include a rack mechanism, or the spindle and the separate track 203 could be eliminated. Accordingly, when the first slide 201 is driven, it follows the linear path defined by the first track 203. The first slide 201 could even, for example, be the rod of an (e.g. hydraulic) actuator (such as a ram), with the cylinder defining the first track 203.

The second slide 202 is also slidably mounted (e.g. by wheels) at its lower end, this time to a second track 204. The second track 204 is non-linear and is shaped to guide the display screen support 7 as it moves between the deployed and stowed positions. In its lower region, the non-linear second track 204 has a linear portion 205. The linear portion 205 runs parallel to the linear path defined by the first track 203.

Figure 8:
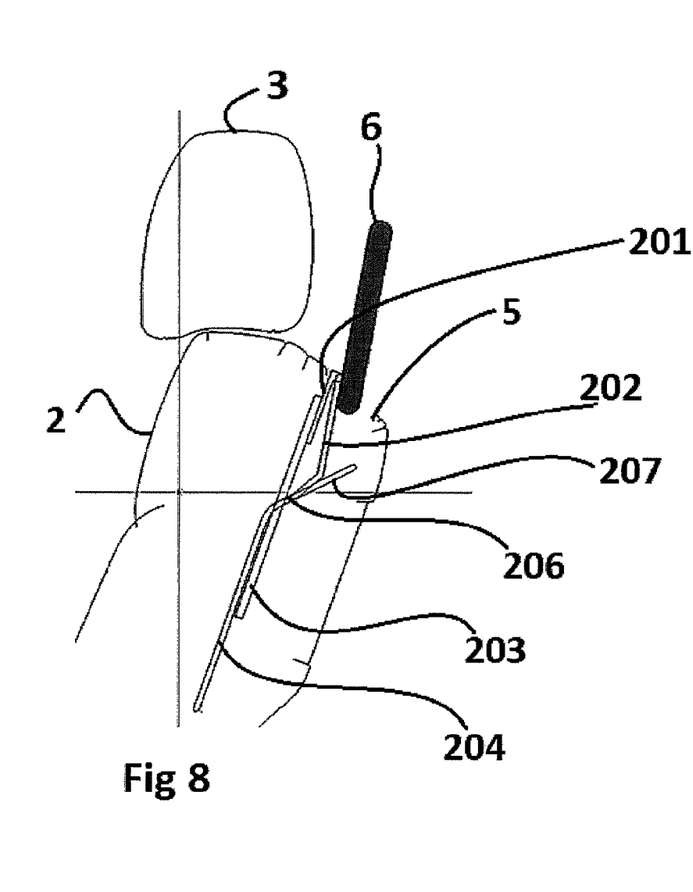
FIG. 8 shows a cross sectional view of the seat of FIG. 7 with the display screen mount in a deployed position, set at a forward tilt.
Figures 9, 10:
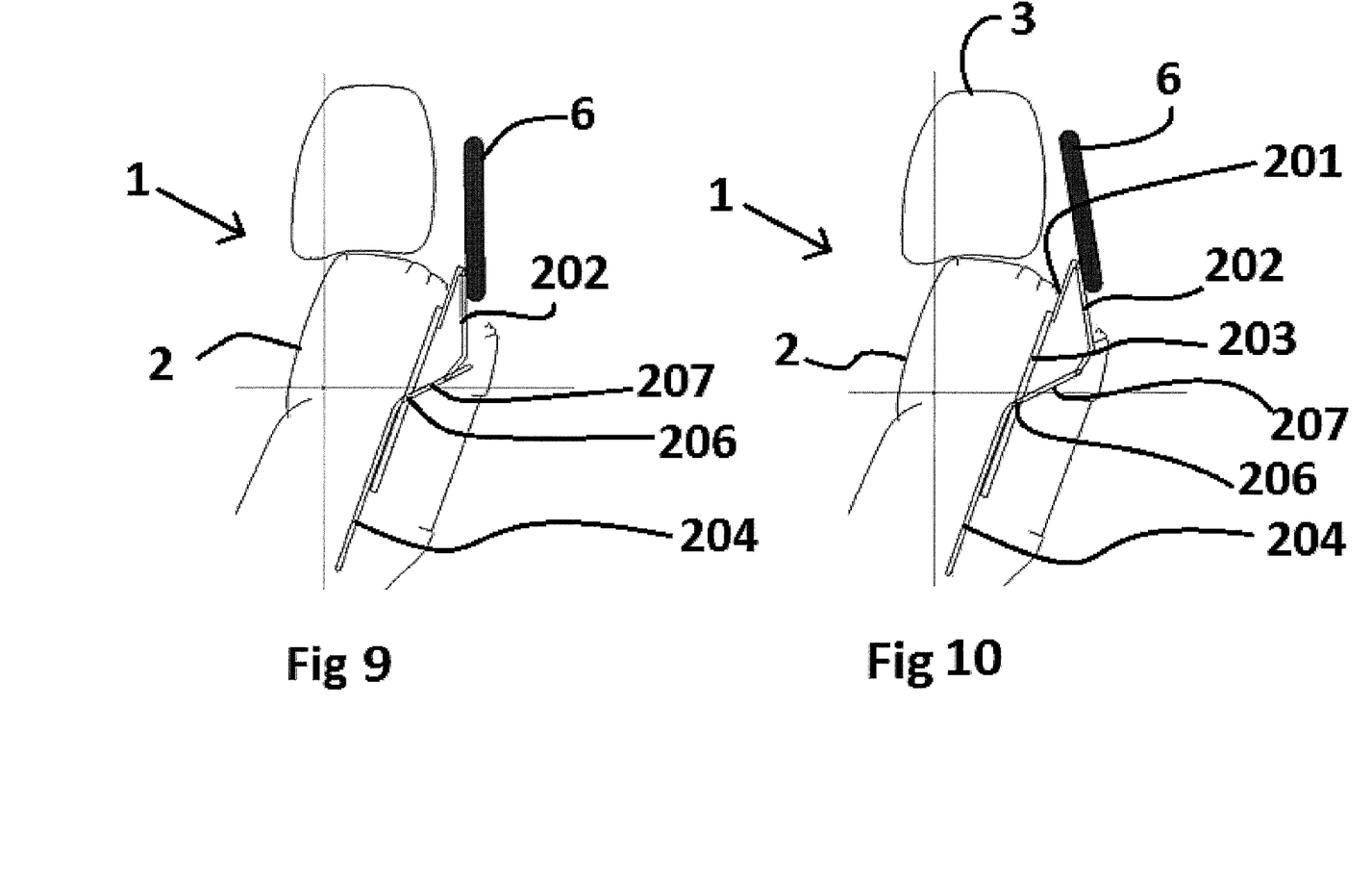
FIG. 9 shows a cross sectional view of the seat of FIGS. 7 and 8 with the display screen mount in a deployed position, set at a neutral tilt.
FIG. 10 shows a cross sectional view of the seat of FIGS. 7 to 9 with the display screen mount in a deployed position, set at a backward tilt.
Figure 11:
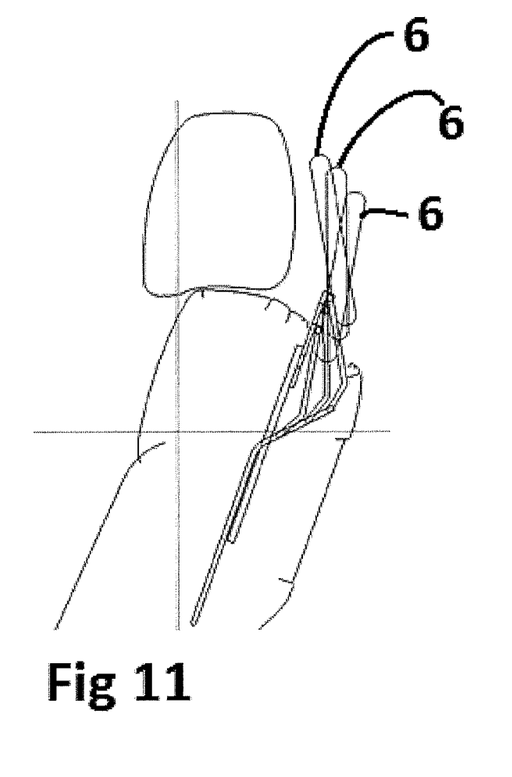
FIG. 11 shows a cross sectional view of the seat of FIGS. 7 to 10 in the deployed position showing backward, forward and neutral tilts.

In an upper region, best seen in FIGS. 8-10, the second track 204 has a non-linear portion 206, which deviates from the linear path defined by the linear portion 205 in the lower region; the non-linear portion 206 curves away from axis of the linear path, longitudinally, towards the housing 4 and away from the axis of the body 2 of the seat 1. The non-linear portion 206 then straightens up to continue to define a straight path 207, which will be followed by the slide 102, upwards and away from the body 2 of the seat 1. Although it is straight, the path 207 is considered to be non-linear as it does not continue the linear path defined by the linear portion 205 of the second track 204 in its lower region.

Figure 7:
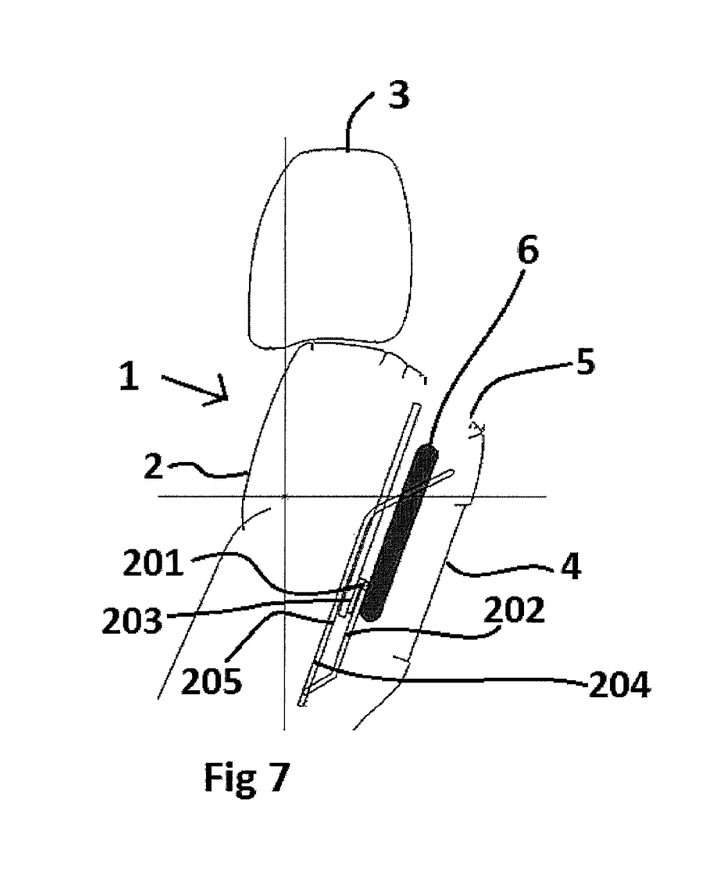
FIG. 7 shows a cross sectional view of a seat including a display screen mounted on a display screen mount according to a second embodiment of the invention, in a stowed position.

In use, to deploy the display screen 6 from the stowed position shown in FIG. 7, an electric switch 60 (shown in FIGS. 13A-13D) is actuated. This causes the first slide 201 to be driven along the linear path defined by the first track 203. The non-driven second slide 202 is thus caused to follow a linear path along the linear portion 205 of the non-linear second track 204. This linear path is followed as the display screen 6 emerges from the slot 5 in the housing 4.

Then, when the display screen 6 has almost entirely emerged from the slot, 5 the lower end of the second slide 202, which is slidably connected to the second track 204 reaches the non-linear portion 206. The first slide 201 continues to follow a linear motion, driving the display 6 upwards. However, the lower end of the second slide 202 follows a non-linear path, curving away from the axis of the body 2 of the seat 1. Because the display support 7 is pivotally mounted to the first slide 201 and fixedly mounted to the second slide 202, this movement causes the support 7 to it pivots about the hinge 9, with the result that the base of the display support 7 (and the display 6) moves longitudinally away from the axis of the body 2 of the seat 1. Correspondingly, the top of the display tilts towards the axis of the body 2, and towards the headrest.

FIG. 8 shows the configuration of the display screen 6 and its mount when this tilting action has just begun, with the lower end having travelled round the curved region of the non-linear portion 206 onto the start of the straight path 207.

In this position, where the second slide has not travelled far along the straight path 207 making up part of the non-linear portion 206, the display screen is almost parallel with the axis of the linear first track 203. Since the axis of the body 2 of the seat 1 is leaning backwards, the top of the screen is tilted backwards with respect to the seat 1, or at a forward tilt, with respect to the user.

As the first slide 201 is driven along the linear path defined by the first track 203, the lower end of the second slide 202 continues up the straight path 207 in the non-linear portion 206 of the second track 204, it eventually reaches the end of the path 207 at its uppermost and longitudinally furthest from the body 2 of the seat 1 (closest to the housing 4) as shown in FIG. 10. At this point, the second slide 202 is at its greatest angle with respect to the first slide 201 and therefore, the display 6 is angled backward, with its top closest to the headrest and its base further from the axis of the body 2 of the seat 1, towards the user.

In between the forward tilt shown in FIG. 8 and the backward tilt shown in FIG. 10, when the first slide 201 is not fully extended, the second slide is positioned between the curved portion of the non-linear region 206 and the end of the straight path 207. Accordingly, a neutral position can be defined, e.g. half way along the straight path, in which the angle of the display is roughly in line with the axis of the headrest, and most likely to be at a suitable viewing angle to an average sized rear-seat passenger, if the seat 1 is occupied by an average sized occupant in an ordinary position (e.g. height and orientation of the seat body.

Backrests of seats are normally rotatably mounted at their base. Accordingly, leaning back the seat body 2 lowers the height of the slot 5 through which the display screen 6 exits the housing 4. On the other hand, leaning forward towards a straight upright position raises the height of the slot.

The display screen 6 exits the slot in a plane parallel to the axis of the seat body 2. Therefore, it too is leant backward with respect to the seat i.e. tilted forward with respect to the viewer. Accordingly, when the seat 1 is leant back, the user (viewer) is likely to wish to tilt the display screen 6 backwards (that is to say, to lean the top of the screen in the direction of the back of the screen, away from the viewer). This is achieved by extending the first slide 201 as far as possible, which also raises the height, therefore both bringing about the correct angle and adjusting towards a better height.

In use, a user wishing to deploy the screen 6 from the stowed position as shown in FIG. 7, to a deployed position as shown in FIGS. 8 to 11 may manipulate a switch 60 as shown in FIGS. 13A-13D in order to activate the electric drive. At this point, the first slide 201 is driven upwards along the linear path defined by the first track 203, which causes the second slide 202 to be driven along the second track 204. As the slides 102, 202 are moved along the tracks 203, 205, the display screen 6 is moved upwards and follows the path described above, as the second slide 202 reaches the non-linear portion of the second track 204.

In a new installation of a seat 1 and display screen 6 in a vehicle, for example, the support 7 and hence display screen 6 may be provided with a default deployment memory position, this may be the neutral position as shown in FIG. 9, in which it is expected that the seat 1 is upright and the height of the passenger behind the seat is such that the screen is at eye level. The position of the display screen 6 may not be optimal, especially if the body 2 of the seat 1 is moved to a different position, e.g an especially upright, or unusually laid back position, in which case, for an average height viewer, the orientation of the display screen 6 would need to be reclined to the "forward tilt" and inclined to the "backward tilt" positions shown in FIGS. 8 and 10 respectively.

Figure 13A:
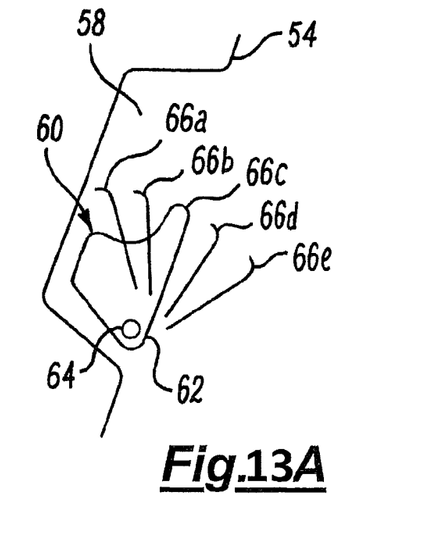
FIG. 13A illustrates a side view of a switch mechanism for the display screen mount of FIGS. 7-12, in a neutral position.
Figure 13B:
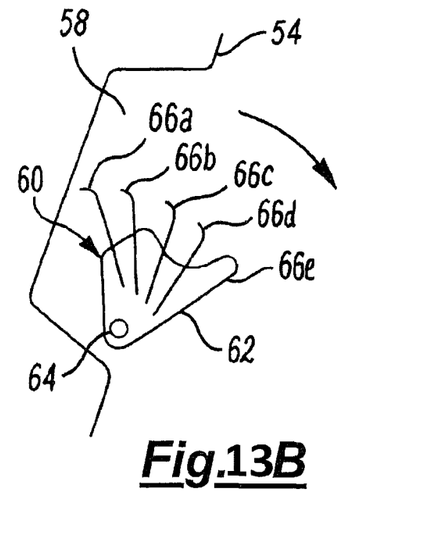
FIG. 13B illustrates the switch mechanism in a deployment memory position.
Figure 13C:
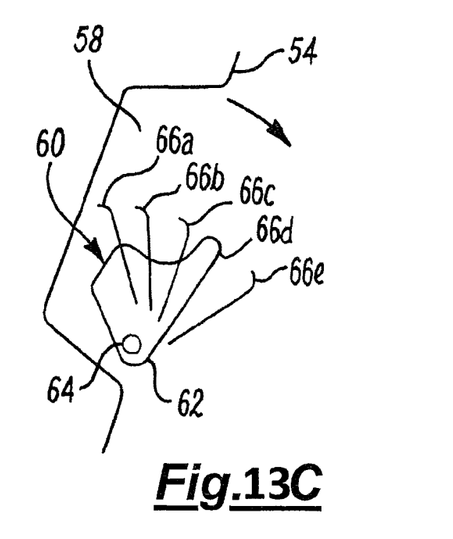
FIG. 13C illustrates the switch mechanism in a reclining adjustment position.
Figure 13D:
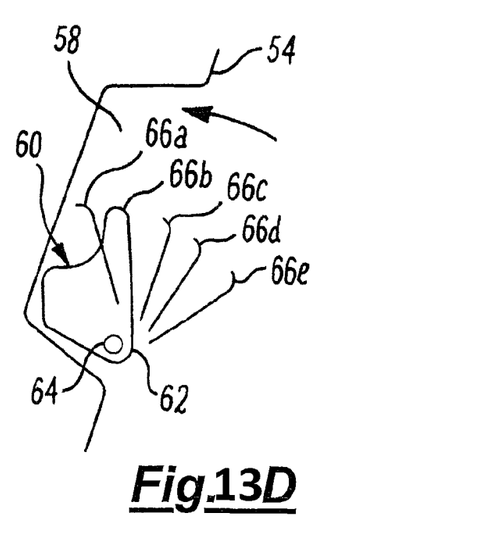
FIG. 13D illustrates the switch in an inclining adjustment position.

As shown in FIGS. 13A-13D, the seat 1, or another part of the vehicle (not shown), e.g. an armrest (not shown) is provided with a switch 60 which enables adjustment of the deployment position of the display 6 by a user. The switch 60 is a rocker switch having five positions 66a, 66b, 66c, 66d, 66e, corresponding to the stowing position 66a, a inclining detent 66b, a neutral position 66c, a reclining detent 66d and a deployment memory position 66e. The switch 60 is manipulated by a user, who can move the switch between all of the positions. In use the switch 60 is urged to the neutral position 66c shown in FIG. 13A, unless a user manipulates the switch 60. A user may move the switch 60 in one direction, through the reclining detent 66d to the deployment memory position 66e as shown in FIG. 13B. A user may also move the switch 60 through the inclining detent 66b to the stowing position 66a in the opposite direction. A user may also move the switch 60 to the reclining detent 66d, as shown in FIG. 13C, in order to adjust the deployment position of the display 6 in one direction, and to the inclining detent 60b, to move the display position in the opposite direction as shown in FIG. 13D. The deployment memory position 66e, when activated, effects the default position of the deployment of display 6 as shown in FIG. 9, and the stowing position 66a when activated, effects the stowed position of display 6 as shown in FIG. 7, the display being entirely situated beneath the slot 5 in the housing 4 of the seat 1.

The inclining and reclining detents 66b, 66d between the stowing position and deployment memory position have respective functions, the reclining detent 66d enables the user to adjust the position of the display 6 in a forward (and downward) direction towards user in the position shown in FIG. 8, and the inclining detent 66b enables a user to adjust the position of the display in a backward (and upward) direction towards the position shown in FIG. 10 away from the user. In use, a user may activate either detent 66b, 66d of the switch 60, which activates the electric drive to drive the first slide 201 in the required direction, in order to adjust the position of the display screen 6 relative to the seat 9 and the user. When the required position has been achieved, a user may release the switch 60 which moves back to the neutral position 66c, so that the display screen 6 remains in the desired position. At this point, suitable electronic means may store the data of the new display screen deployment position, and seat position as the new default deployment memory position. A user may then stow the display screen 6 when required, by moving the switch 60 to the stowing position 66a. When the user next utilises the display screen 6, moving the switch 60 to the deployment memory position 66e will automatically move the display screen 6 to the last known deployment memory position and user may adjust the display screen 6 again as necessary.

When the switch is moved to the deployment memory position 66e, or the stowing position 66a, the display screen 6 is caused to move at a first, relatively fast, speed, on the other hand, when the switch is moved to the inclining detent 66b, or the reclining detent 66d, the display screen 6 is caused to move at a second, relatively slow, speed, in order to achieve fine adjustment.

The above embodiment is/embodiments are described by way of example only. Many variations are possible without departing from the scope of the invention as defined in the appended claims.

What is claimed is:

1. A display screen mount comprising
a display screen support operably connected to at least one guide;
the guide defining a guide path for guiding the display screen support from a stowed position to a deployed position and allowing adjustment of the viewing angle in the deployed position;
wherein:
the guide path has a first linear portion such that the display screen support is guided along a first linear path, into a deployed position in which a display screen attached to the display screen support in use, is visible to the user; and
the guide path has a second non-linear portion which allows different viewing angles of the display screen to be adopted in the deployed position;
wherein the at least one guide comprises at least one track along which a first slide slides; and a second track along which a second slide slides;
wherein the first slide is driven by a linear drive and the second slide is non-driven;
wherein the tracks along which the slides are driven define different paths, a first track defining a linear path and a second track defining an at least partially non-linear path; and
wherein the second non-linear portion of the guide path comprises an outwardly opening portion, defined by the second at least partially non-linear path, in which variation of the angle of the display screen support is manually adjustable.

2. The display screen mount according to claim 1 wherein the display screen support is pivotally mounted to the first slide.

3. The display screen mount according to claim 2 wherein the display screen is pivotally mounted by a friction hinge.

4. The display screen mount according to claim 1 wherein the display screen mount is mounted in a seat back of a seat, for viewing by a passenger in a seat behind.

5. The seat comprising the display screen mount according to claim 4 wherein the seat is mounted in a vehicle.

6. A display screen mount comprising
a display screen support operably connected to at least one guide;
the guide defining a guide path for guiding the display screen support from a stowed position to a deployed position and allowing adjustment of the viewing angle in the deployed position;
wherein:
the guide path has a first linear portion such that the display screen support is guided along a first linear path, into a deployed position in which a display screen attached to the display screen support in use, is visible to the user; and
the guide path has a second non-linear portion which allows different viewing angles of the display screen to be adopted in the deployed position;
wherein the at least one guide comprises at least one track along which a first slide slides; and a second track along which a second slide slides;
wherein the tracks along which the slides are driven define different paths;
wherein the display screen support is fixedly mounted to the second slide; and
wherein the display screen mount is mounted in a seat back of a seat, for viewing by a passenger in a seat behind;
wherein a first track defines a linear path and second track defines an at least partially non-linear path;
wherein the first slide is driven by a linear drive and the second slide is non-driver; and
wherein the display screen support is pivotally mounted to the first slide.

7. The display screen mount according to claim 6 wherein the second track comprises a first linear portion, in which longitudinal movement of the slide is restricted, such that the angle of the screen is fixed during initial deployment, and a second non-linear, open portion, in which longitudinal motion of the slide is less restricted than longitudinal motion of the slide in the first linear portion, such that in the deployed position, the viewing angle may be adjusted by manual longitudinal movement of the screen support.

8. The display screen mount according to claim 7, wherein the second track comprises a third non-linear portion, prior to the second non-linear, open portion, in which movement of the first slide along the first linear path results in longitudinal motion of the second slide along the third non-linear portion, so as to change the angle of the screen.

9. The display screen according to claim 6 wherein the outwardly opening portion of the guide path, defined by the second at least partially non-linear path of the second track is triangular.

10. The display screen mount according to claim 6 wherein the first slide is driven by a linear drive and the second slide is non-driven.

11. The display screen mount according to claim 10 wherein the display screen support is pivotally mounted to the first slide.

12. The display screen mount according to claim 6 wherein the display screen support is pivotally mounted to the first slide.

13. The display screen mount according to claim 6 wherein the display screen support is pivotally mounted to the first slide.

14. A display screen mount comprising
a display screen support operably connected to at least one guide;
the guide defining a guide path for guiding the display screen support from a stowed position to a deployed position and allowing adjustment of the viewing angle in the deployed position;
wherein:
the guide path has a first linear portion such that the display screen support is guided along a first linear path, into a deployed position in which a display screen attached to the display screen support in use, is visible to the user; and
the guide path has a second non-linear portion which allows different viewing angles of the display screen to be adopted in the deployed position;
wherein the at least one guide comprises at least one track along which a first slide slides; and a second track along which a second slide slides; and wherein the tracks along which the slides are driven define different paths;
wherein a first track defines a linear path and a second track defines an at least partially non-linear path; and
wherein the viewing angles in the deployed position may be adjusted electrically and the second non-linear portion of the guide path is defined by the second at least partially non-linear path of the second track;
wherein the second track comprises a first linear portion, in which longitudinal movement of the slide is restricted and a second non-linear portion, whereby movement of the first slide along the first linear path results in longitudinal motion of the second slide along the second non-linear portion, so as to change the viewing angle of the display screen.

15. The electrically adjustable display screen mount according to claim 14 mounted in a seat back, wherein the first linear path and the linear portion of the second at least partially non-linear path are parallel to the seat back, whereby movement along the linear path brings the screen into a deployed position and movement along the non-linear portion of the guide path changes the viewing angle of the screen.

16. The seat comprising an electrically adjustable display screen mount according to claim 15, wherein movement in the deployment direction along the non-linear portion of the guide path tilts the display screen support, so as to change the viewing angle such that the base of a display screen mounted on the display screen support moves longitudinally away from the back of the seat and/or the top of a display screen mounted on the display screen support moves longitudinally towards a headrest.

17. The seat according to claim 16 wherein movement of the base longitudinally away from the back of the seat, and/or movement of the top longitudinally towards a headrest occurs simultaneously with axial movement in the deployment direction.

* * * * *